(12) United States Patent
Fedorov et al.

(10) Patent No.: US 12,320,340 B1
(45) Date of Patent: Jun. 3, 2025

(54) ELECTROTHERMAL SUBASSEMBLY OF STEAM THRUSTER FOR NANOSATELLITES

(71) Applicant: Steamjet Space Systems, Ltd., Ashford (GB)

(72) Inventors: Vladimir V. Fedorov, Novosibirsk (RU); Marco Pavan, Coventry (GB)

(73) Assignee: STEAMJET SPACE SYSTEMS, LTD., Birmingham (GB)

( * ) Notice: Subject to any disclaimer, the term of this patent is extended or adjusted under 35 U.S.C. 154(b) by 0 days.

(21) Appl. No.: 18/421,328

(22) Filed: Jan. 24, 2024

(51) Int. Cl.
  *F03H 1/00* (2006.01)
  *B33Y 80/00* (2015.01)
  *B64G 1/40* (2006.01)

(52) U.S. Cl.
  CPC ......... *F03H 1/0031* (2013.01); *F03H 1/0093* (2013.01); *B33Y 80/00* (2014.12); *B64G 1/415* (2023.08); *F03H 1/0012* (2013.01)

(58) Field of Classification Search
  CPC ...... B64G 1/415; F03H 1/0031; F03H 1/0093
  See application file for complete search history.

(56) References Cited

U.S. PATENT DOCUMENTS

| | | | |
|---|---|---|---|
| 11,077,964 B1 * | 8/2021 | Grubisic | ................ B64G 1/415 |
| 2013/0305687 A1 * | 11/2013 | Nagao | ...................... F02K 9/97 60/251 |

* cited by examiner

*Primary Examiner* — Lorne E Meade
(74) *Attorney, Agent, or Firm* — Muncy, Geissler, Olds & Lowe, P.C.

(57) ABSTRACT

An electrothermal subassembly of a steam thruster for nanosatellites. The subassembly has an inlet port for the supply of the working mass, heat exchangers with containing ducts, at least one heating element, a supersonic micro-nozzle, and a plurality of rods forming a truss structure.

9 Claims, 4 Drawing Sheets

ELECTROTHERMAL SUBASSEMBLY OF STEAM THRUSTER FOR NANOSATELLITES WITH GAS-DYNAMIC ACCELERATION OF THE WORKING MASS

ELECTROTHERMAL SUBASSEMBLY OF STEAM THRUSTER FOR NANOSATELLITES WITH GAS-DYNAMIC ACCELERATION OF THE WORKING MASS

ELECTROTHERMAL SUBASSEMBLY OF STEAM THRUSTER FOR NANOSATELLITES

FIELD OF THE INVENTION

The present invention pertains to propulsion devices, specifically addressing a subassembly of a steam thruster for small spacecraft or nanosatellites.

DESCRIPTION OF THE PRIOR ART

A growing scientific, military and commercial interest surrounds the development of small, low-cost, miniaturized spacecraft. Notably, small satellites (nanosatellites) that can be launched as piggyback payloads and can be used by universities and private companies, are of significant interest. A special CubeSat design is becoming increasingly popular. A distinctive feature of CubeSat satellites is that they are assembled from 10×10×10 cm cubes in quantities of 1 or more.

CubeSat satellites provide an affordable platform for scientific and technological research in space. Due to their cost-effectiveness, CubeSat satellites have proliferated. The inclusion of the propulsion device enables the correction of the satellite orbit, which significantly expands its functionality. Propulsion devices can be broadly divided into two categories: those storing energy inside the working mass (e.g. cold gas, liquid and solid fuel) and those transferring energy to the working mass externally (e.g. electrothermal propulsion devices with gas-dynamic acceleration of the working mass, electromagnetic and electrostatic propulsion devices).

CubeSat satellites are promising due to their small size, cost-effectiveness and ease of construction. These features make them a popular choice for many universities and private companies which use them for lower Earth orbit (LEO) work. Of particular interest is the creation of orbital constellations using CubeSats. This enables continuous monitoring of the Earth's surface and atmosphere, as well as providing communication services. To establish and maintain their mutual arrangement within an orbital constellation, individual satellites must be equipped with on-board propulsion devices.

The growing popularity of CubeSats in the late 1990s and early 2000s necessitated the development of small and inexpensive propulsion devices suitable for these nanosatellites.

Adapting technical solutions from large satellites to microsatellite propulsion systems typically presents a range of problems, such as: large size, high power consumption, fuel toxicity, high pressures and other challenges. Propulsion systems for microsatellites, not requiring high thrust levels, allow for the exploration of non-standard solutions, such as: the use of liquids as a working mass with subsequent evaporation; electrolysis of liquids followed by the combustion of the generated vapors in the combustion chamber, and so on.

An invention is known (RU 2678240 C2; publ. 24 Jan. 2016; IPC: F03H 1/00) that discloses a spacecraft thruster. It includes a chemical thruster with a nozzle for releasing combustion gas in conjunction with a Hall-effect thruster. The thruster has such a configuration that the nozzle serves as a release channel for particles ejected by the Hall-effect thruster. The thruster can provide high thrust with low specific impulse or relatively low thrust with high specific impulse.

The drawbacks of this invention include high power consumption, which is a challenge for micro and nanosatellites. Additionally, it has an expensive, complex, and large design, rendering it unsuitable for small-sized satellites.

Another known invention (U.S. Pat. No. 9,517,847 B2; publ. Dec. 13, 2016; IPC: F03H 1/00, B64G 1/40, H05H 1/50) discloses a thruster subassembly with a microcathode and magnetic amplification for sustained thrust. The microcathode thruster subassembly comprises a tubular body, a tubular cathode, an insulator, an anode, and a magnetic field. The tubular body includes an open far end. The tubular cathode is positioned within the body and has a far end positioned near the open far end of the body. The insulator is in contact with the cathode, forming the outer cathode-insulator interface. The anode is located inside the body near the open far end of the body. The magnetic field is positioned at or near the outer cathode-insulator interface. The magnetic lines form an angle of incidence from about 20 degrees to about 30 degrees, and preferably about 30 degrees relative to the outer cathode-insulator interface.

A disadvantage of this invention is the high power consumption, which is a problem for microsatellites. It also features an expensive and complex design that makes their integration into small satellites challenging.

Another known invention (U.S. Pat. No. 5,319,926 A; publ. 14.01.1994; IPC: F03H 1/00, F03H 5/00, F02K 11/00) discloses a thruster, which is used, among other purposes, for spacecraft orbit correction. It comprises a body designed as an anode, an expansion nozzle and a rod-shaped, electrically insulated cathode fixed centrally within it. The cathode is positioned in a combustion chamber where gunpowder or powder gases are injected. The tip of the cathode is spaced apart to form a small air gap with the narrowed cross-section of the nozzle throat. The flow of gas between anode and cathode ignites an electric arc, providing additional heat energy to the powder gases.

The disadvantages of this invention include its operation requiring high power consumption and being associated with high energy losses, rendering such thrusters more complex and less efficient to use.

Another invention is known (CN 113716074 A; publ. 30.11.2021.; IPC: B64G 1/40, B64G 1/10) that discloses a satellite comprising a body and a propulsion system. At least one of said propulsion systems utilizes a microcathode arc propulsion system. This microcathode arc propulsion system comprises a power supply system, including a power source, an inductor, and a control switch; a propeller is arranged in parallel with the control switch of the power supply system. The propeller comprises: a cathode with at least one first section made of the first material and at least one second section made of the second material. The first and second sections are arranged adjacent to each other in the axial direction, with the ablation rate of the first material greater than the deposition rate, and the ablation rate of the second material less than the deposition rate. The invention ensures that the conductive film is in a state of dynamic balance with the bidirectional effects of ablation and deposition, thereby extending the lifetime of the satellite.

A disadvantage of this invention is its high power consumption, posing a challenge for microsatellites. It also features an expensive and complex design that makes it difficult to manufacture small satellites with this propulsion device.

The disadvantages of the aforementioned inventions include high power consumption, which is a problem for nanosatellites. Additionally, all the mentioned systems are expensive and have complex designs, or they are large in size, not suitable for small satellites, such as CubeSats.

Existing propulsion devices, while offering varying levels of performance and efficiency, are costly to manufacture and often rely on technology designed for larger spacecraft. This makes them ill-suited for microsatellites such as CubeSats. Therefore, there is a need for a propulsion device that features low power consumption, non-toxic chemicals, small size and no high pressure.

SUMMARY OF THE INVENTION

The objective of the present invention is to develop a small steam thruster subassembly with low power consumption. A steam thruster subassembly refers to a crucial assembly unit of the thruster which transfers energy from an external source to the working mass, subsequently leading to its gas-dynamic acceleration.

This objective is accomplished by the claimed invention resulting in technical enhancements that increase the efficiency of the thruster, thereby reducing the power consumption while maintaining its small size. Enhanced efficiency is attained through the utilization of compact heat exchangers, each containing channels, and at least one built-in heater. Within these channels, the working mass is evaporated and superheated. The working mass enters the heat exchangers through the working mass inlet and exits through the supersonic micro nozzle. The special design of the heat exchangers and rods, which form a truss structure, along with the incorporation of reflective surfaces, provide a reduced heat flow to adjacent elements of the propulsion device. This achieves the most efficient use of energy, maintaining the small size through the compact arrangement of the elements and the use of small-sized elements facilitated by the highly efficient design.

The technical result is achieved by an electrothermal subassembly of the steam thruster for nanosatellites, comprising a working mass supply inlet, heat exchangers, each containing channels with at least one heating element, a supersonic micro-nozzle, and a plurality of rods forming a truss structure.

In an alternative embodiment, this invention comprises a working mass supply inlet, three annular heat exchangers nested within each other, at least one heating element within the central heat exchanger, a supersonic micro nozzle, six rods forming a truss structure, and heat shields. The heat exchangers may be configured to be positioned within each other. Also, the present steam thruster electrothermal subassembly can be manufactured using an additive manufacturing process.

DESCRIPTION OF THE DRAWINGS

To facilitate understanding of the invention, a more specific description of the invention briefly described above will be given with reference to specific embodiments, which are illustrated in the accompanying drawings. These drawings depict only embodiments of the invention and therefore should not be considered as limiting the application scope of the invention. Further specifics and details regarding the invention will be elaborated upon, with aspects of the invention explained through the accompanying drawings.

The object of the claims in the present patent application is described item by item and clearly stated in the Claims. The aforementioned objectives, features and advantages of the invention are apparent from the following detailed description in conjunction with the accompanying drawings as follows:

Figure 1:
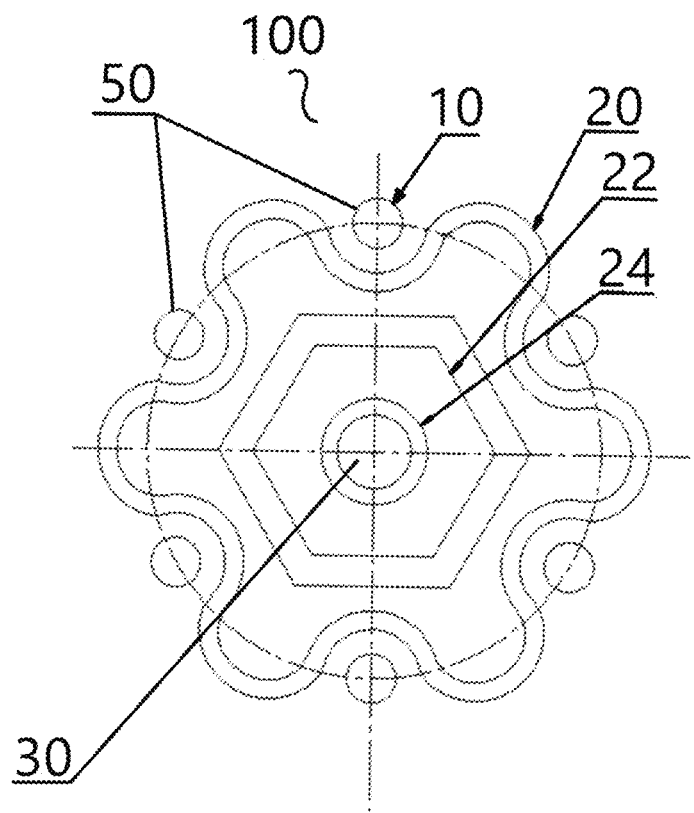
FIG. 1 shows a schematic diagram of the steam thruster electrothermal subassembly for various embodiments of the invention.

Said drawings are explained by the following items: electrothermal subassembly of the steam thruster—100; Rods—10; Truss structure—50; Inlet port—12; Supersonic micro-nozzle—14; First heat exchanger—20; Second heat exchanger—22; Third heat exchanger—24; Heating element—30.

DETAILED DESCRIPTION OF THE INVENTION

The following detailed description of an embodiment of the invention gives numerous details of the implementation intended to provide a clear understanding of the present invention. However, a person with ordinary skill in the art can understand how the present invention can be used, either with or without these implementation details. In certain instances, well-known methods, procedures and components are not described in detail to avoid unnecessarily hindering the comprehension of the features of the present invention.

Furthermore, it is clear from the foregoing narrative that the invention is not limited to the shown embodiment. Numerous potential modifications, alterations, variations and substitutions which maintain the substance and form of the present invention are apparent to experts having ordinary skill in the art.

The terms "embodiment", "particular version" or similar expressions imply that related features, structures or characteristics described in an embodiment are included in at least one embodiment of the present invention. Consequently, the phrases "in an embodiment," "in a particular embodiment" or similar expressions in this specification do not necessarily refer to the same specific embodiment.

The steam thruster electrothermal subassembly 100 for nanosatellites comprises a working mass supply inlet 12, heat exchangers 20, 22, 24, each containing ducts (not shown), at least one heating element 30, a supersonic micro-nozzle 14, and a plurality of rods 10 forming a truss structure 50. The term "plurality" refers to a number of rods sufficient to form a truss structure. The heat exchangers may be configured to be positioned within each other.

FIG. 1 shows a top view of the steam thruster electrothermal subassembly 100 configured for nanosatellites propulsion. The steam thruster electrothermal subassembly 100 includes a plurality of rods 10 forming a truss structure 50 of the steam thruster electrothermal subassembly 100. Also, the steam thruster electrothermal subassembly 100 includes an inlet 12 (shown in FIG. 2) that is configured to supply a fuel fluid (not shown), such as water. On the opposite side from the inlet 12 along the working mass flow path, there is a supersonic micro-nozzle 14 (shown in FIG. 2 and FIG. 4) from which the working mass is released.

Figure 2:
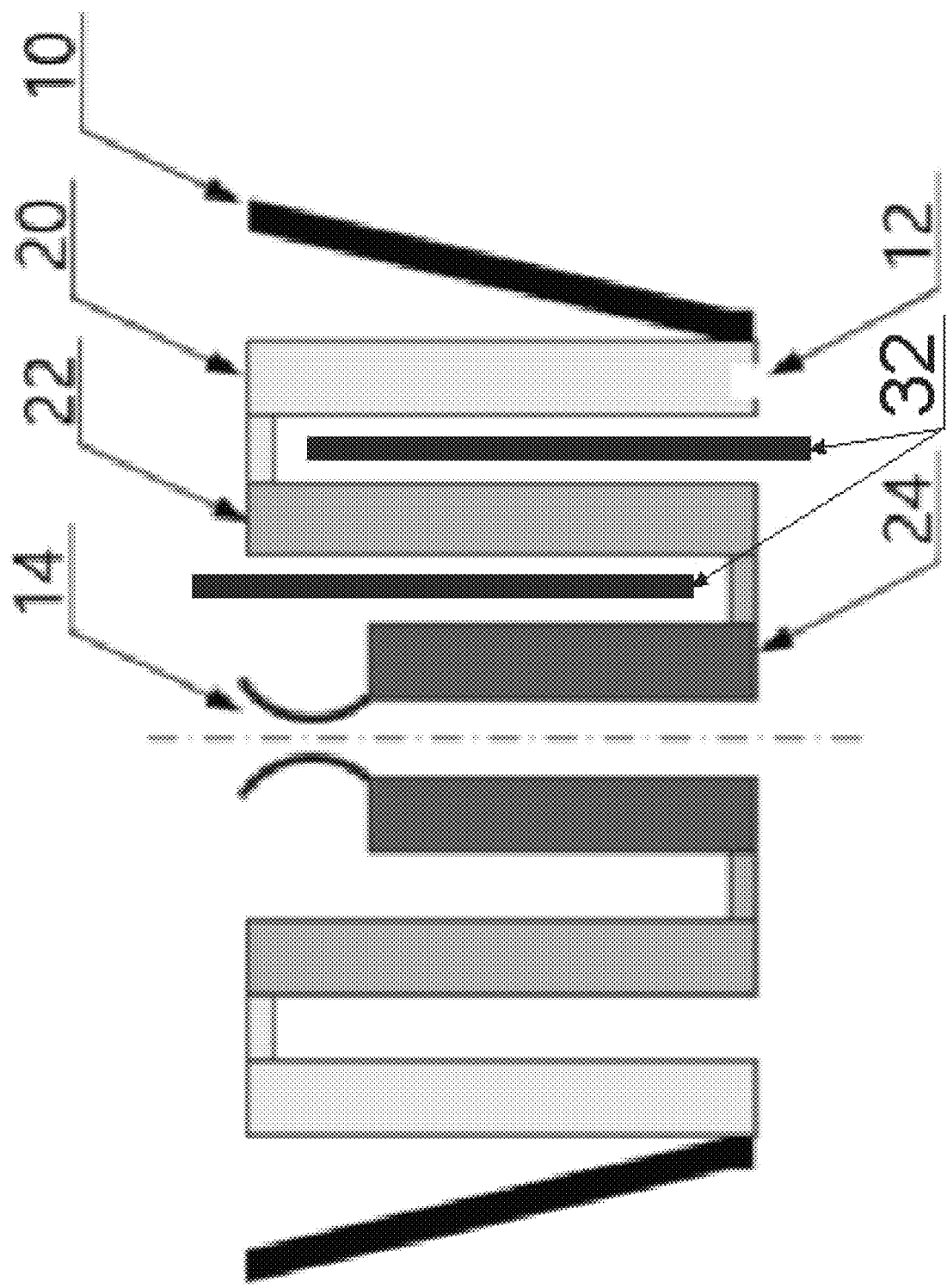
FIG. 2 is a schematic diagram of an electrothermal subassembly of the steam thruster showing a section view of the coupled heat exchangers; the supersonic micro-nozzle is positioned on the opposite side from the inlet port along the working mass flow path, shown for various embodiments of the invention.

As can be seen in FIG. 1 and FIG. 2, in one of the embodiments, the steam thruster electrothermal subassembly 100 includes heat exchangers; as an example, three heat exchangers are shown: the first heat exchanger 20, the second heat exchanger 22, and the third heat exchanger 24, which are nested within and connected to each other. However, the steam thruster electrothermal subassembly 100 may include any number of heat exchangers. The number and configuration of heat exchangers may be selected based on the purpose, size, and parameters of the spacecraft utilizing the present steam thruster electrothermal subassembly 100.

In FIG. 1, in one of the embodiments, the first heat exchanger 20 is placed within a truss structure 50 formed by a plurality of rods 10. A second heat exchanger 22 is arranged within the first heat exchanger 22, and a third heat exchanger 24 is arranged within the second heat exchanger 22 and includes a heating element 30 (as shown in FIG. 1). This arrangement aims to keep the steam thruster electrothermal subassembly compact and axial symmetric, since distortions during its heating may cause deflection of the steam jet, which would negatively affect nanosatellite control. Here, axial symmetry refers to the symmetry with respect to 360°/n rotations and/or mirror symmetry with respect to the construction axis. Each heat exchanger can be varied in shape to achieve the desired configuration and size. For example, the heat exchangers may be round, ribbed, or of wavy form as shown in FIG. 1, but the heat exchanger configurations should always maintain the axial symmetry.

To increase the efficiency of the liquid evaporation, the first heat exchanger 20 is designed so that, as the liquid passes through the heat exchanger 20, it is continuously forced into contact with its surface. For this purpose, the first heat exchanger contains channels (not shown) so that the fuel, when introduced at the inlet 12 (shown in FIG. 2), is divided into two or more separate channels that continuously change direction with varying flow curvature. As the liquid changes direction, inertial forces bring it into contact with the heated surface of the first heat exchanger, which results in its effective evaporation and thereby increases the efficiency of the propulsion device. In the other heat exchangers, the steam also moves through channels where it is superheated to increase the specific impulse or, in other words, to reduce the fuel consumption per unit of impulse generated. The use of multiple interconnected heat exchangers, in one embodiment, nested within each other, coupled with the design of the heat exchangers and the presence of channels, directly contributes to achieving the technical results of increased thruster efficiency while maintaining its small size.

According to the present invention shown in FIG. 2, the second heat exchanger 22 may be coupled to the first heat exchanger 20 on the opposite side relative to the point of attachment of the rods 10 to the first heat exchanger and the inlet 12. The supersonic micro-nozzle 14 is located on the opposite side from the working mass inlet into the third heat exchanger. The supersonic micro-nozzle 14 has a critical cross-sectional diameter of 200 microns to 800 microns, and may have other parameters suitable for the desired thrust range and specific impulse.

Figure 3:
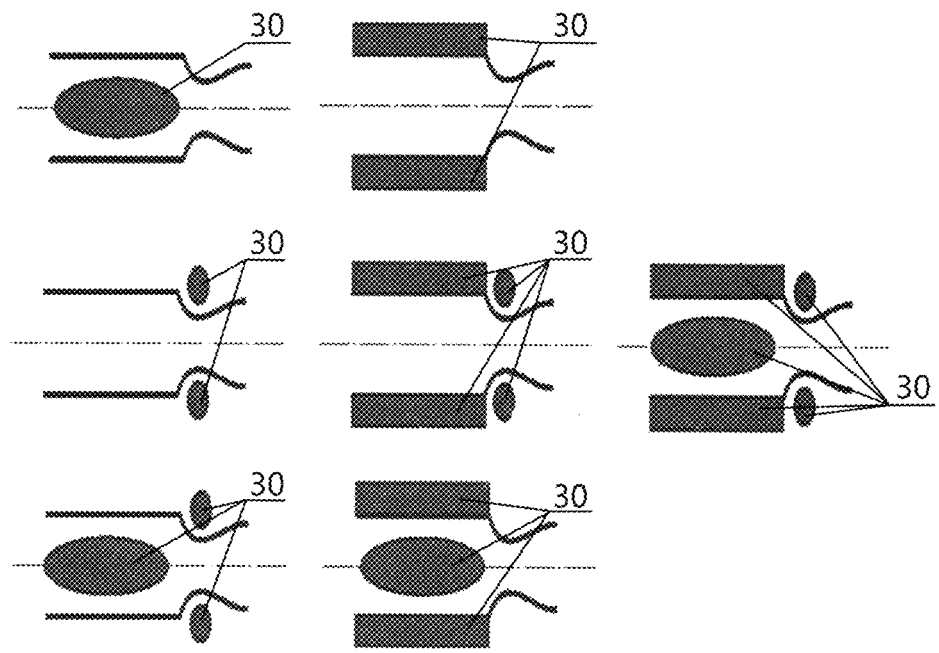
FIG. 3 is a schematic diagram of configurations of steam thruster electrothermal subassemblies with variations in thermal element arrangements for various embodiments of the invention.

In various embodiments of the present invention, the heating element 30 may take the form of any electrothermal heating element. As shown in FIG. 3, the steam thruster electrothermal subassembly 100 may include a number of heating elements 30 with various configurations and possible positions within the steam thruster electrothermal subassembly 100. For example, as shown in FIG. 1, the heating element 30 may be located in the center of the steam thruster electrothermal subassembly 100, enabling a compact arrangement of the steam thruster electrothermal subassembly 100 to achieve high performance at relatively small dimensions. The central placement of the heating element 30 also ensures efficient heating of the heat exchangers 20, 22, 24, so that a heating element of relatively lower power, and therefore smaller size, can be used to conserve energy and to maintain the axial symmetry of the steam thruster electrothermal subassembly 100. The configuration of the thruster heating elements, their location, and their power have direct impact on the technical results to be achieved.

The central location of the heating element 30 ensures a counterflow of its generated heat against the working mass; in other words, the hottest part of the steam thruster electrothermal subassembly is located closer to the supersonic micro nozzle 14, which provides for the maximum superheating of steam at that point, while the temperature of the heat exchangers decreases towards the inflow of the liquid working mass. Thus, a high temperature gradient is constantly maintained between the surfaces of the heat exchangers 20, 22, 24 and the heated working mass along the entire flow path of working mass from the inlet port 12 to the supersonic micro nozzle 14. This arrangement achieves high efficiency and reduces parasitic heat flow to the external elements of the steam thruster and satellite surfaces.

According to the present invention, the plurality of rods 10 form a truss, enhancing rigidity of the steam thruster electrothermal subassembly 100 and the steam thruster as a whole. This construction is capable of withstanding the loads associated with the launch of a launch vehicle, providing a robust attachment of the heat exchangers to the base, maintaining small dimensions and axial symmetry. In addition, the rods 10 serve as thermal insulation. The size and length of the rods 10 are chosen to achieve the desired thermal isolation, for example to minimize the propagation of heat generated by the heating element within the heat exchangers to the satellite, where the steam thruster, containing said electrothermal subassembly 100 is to be installed. In this context, longer and thinner materials exhibit better thermal insulation properties. In one embodiment of the present invention, the rods 10 may have a length of 25 to 40 mm, a diameter of 1.3 to 2 mm, and be made of titanium. In another embodiment of the present invention, the length of the rods 10 is selected such that the height of the truss structure formed thereby is commensurate with the height of the heat exchangers 20, 22, 24. The number of rods 10 may be six or any greater even number to achieve the desired rigidity and thermal isolation. All these considerations also have a direct impact on achieving the technical results of improving thruster efficiency while maintaining its small size.

Additionally, the steam thruster electrothermal subassembly 100 may include heat shields (32) positioned between the heat exchangers 20, 22, 24, as shown in FIG. 2. Alternatively, the heat shields may be mounted directly on the heat exchangers 20, 22, 24. The heat shields may be manufactured from metal foil that is polished and coated with a material that is highly reflective of thermal radiation (e.g., gold or rhodium). The heat shields reflect heat radiation of the heat exchanger 24, which is located closest to the heating element 30, thereby improving thruster efficiency by reducing heat loss.

Figure 4:
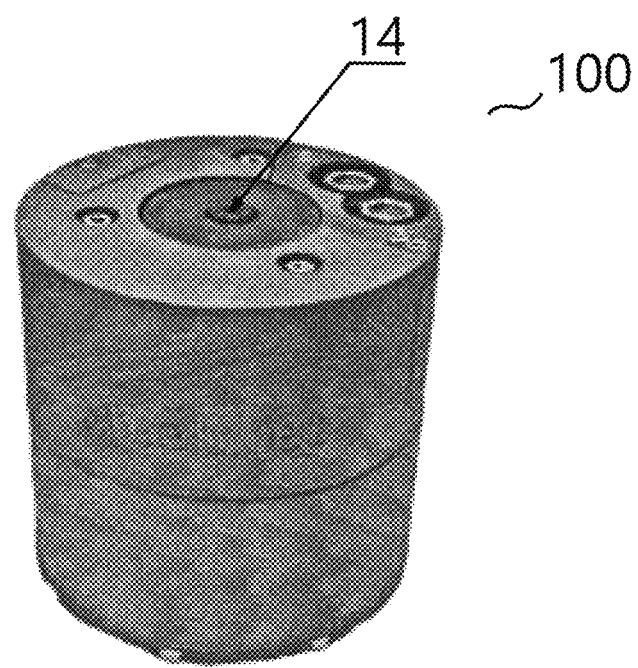
FIG. 4 shows a photograph of an outer view of the propulsion device that can be constructed using the electrothermal subassembly described in the present invention.

The configuration of the steam thruster electrothermal subassembly 100 described herein, facilitates the development of a small and cost-effective steam thruster suitable for nanosatellites, such as CubeSats. Also, this design of the steam thruster electrothermal subassembly is suitable for use with non-toxic fuels, for example water, and has low operating pressure. In particular, the described steam thruster electrothermal subassembly 100 allows for development of a propulsion device, a photograph of which is shown in FIG. 4, with dimensions of 80 mm in diameter and 80 mm in length. It contains a fuel tank, a pressurization system, a PSCS (power supply and control system) and a fuel-hydraulic circuit, providing a thrust of approximately 6 mN, power not exceeding 20 W and a total impulse of about 219 N-s.

In addition, the heat exchangers and components of the steam thruster electrothermal subassembly 100 may be fabricated using additive manufacturing (AM), i.e. 3D printing, to achieve the desired configuration, thrust, power, and impulse. This approach enables the implementation of the unique shape of the heat exchangers with the desired small dimensions.

Presented here is one of the best embodiments of the steam thruster electrothermal subassembly, realized as follows. In the steam thruster electrothermal subassembly the rods form a truss structure, matching the height of the heat exchangers, and are made of printed titanium, with a total of six rods. Within the steam thruster electrothermal subassembly, the heating element is positioned in the center, surrounded with three heat exchangers arranged in a nested and connected manner. The first heat exchanger is designed to force the liquid into continuous contact with its surface as it passes through channels that continuously change direction with varying flow curvature. As the liquid changes direction, inertial forces bring it into contact with the heated surface of the first heat exchanger, which results in its effective evaporation. The steam in the other heat exchangers also moves through channels where it is superheated. The heat exchangers themselves have an axial symmetric configuration. The supersonic micro-nozzle is located on the opposite side from the inlet port along the working mass flow path, and the second heat exchanger is connected to the first heat exchanger on the opposite side relative to the place where the rods are attached to the first heat exchanger.

The terminology used herein is intended only to describe specific embodiments and not to restrict the scope of the present invention. Furthermore, it should be understood that the terms "comprises", "contains" and/or "includes" when used in this specification indicate the presence of claimed features, integer quantities, steps, operations, elements and/or components, but do not preclude the presence or addition of other features, integer quantities, steps, operations, components of elements and/or groups thereof.

The respective constructions, materials, acts and equivalents of all means or elements of a step, together with function in the claims below are intended to include any construction, material or act for performing a function in conjunction with other claimed elements. The description of the present invention serves the purposes of illustration and explanation, but is not intended to be exhaustive or limited to the invention in the form described. To experts having ordinary skill in the art, many potential modifications and variations will be apparent that do not depart from the scope and spirit of the invention. The chosen embodiments are presented to best elucidate the principles and practical applications of the invention, and to enable those of ordinary skill in the art to understand the invention for various embodiments with various modifications that are suitable for the particular intended application.

Thus, the mentioned elements have a direct impact on the technical results, which consist in increasing the efficiency of the thruster while maintaining its compact size.

The present application materials offer a disclosure of the preferred embodiment of the claimed technical solution. However, this should not constrain other specific embodiments falling within the requested scope of legal protection and evident to persons with ordinary skill in the art.

The invention claimed is:

1. An electrothermal subassembly of a steam thruster for nanosatellites, comprising:
    an inlet port for the supply of the working mass;
    a plurality of heat exchangers, each one of the plurality of heat exchangers containing ducts;
    at least one heating element;
    a supersonic micro-nozzle;
    a plurality of rods forming a truss structure; and
    a heat shield positioned between an adjacent pair of the heat exchangers of the plurality of heat exchangers.

2. The electrothermal subassembly of the steam thruster for nanosatellites according to claim 1, wherein the plurality of heat exchangers comprises three heat exchangers.

3. The electrothermal subassembly of the steam thruster for nanosatellites according to claim 1, wherein the plurality of heat exchangers are nested within each other.

4. The electrothermal subassembly of the steam thruster for nanosatellites according to claim 1, wherein the plurality of heat exchangers have an axial symmetric configuration.

5. The electrothermal subassembly of the steam thruster for nanosatellites according to claim 1, wherein the plurality of rods are selected with a length such that the height of the truss structure formed by them is commensurate with the height of the plurality of heat exchangers.

6. The electrothermal subassembly of the steam thruster for nanosatellites according to claim 1, wherein the at least one heating element is situated within a central heat exchanger.

7. The electrothermal subassembly of the steam thruster for nanosatellites according to claim 1, wherein the plurality of rods comprises six rods.

8. The electrothermal subassembly of the steam thruster for nanosatellites according to claim 1, wherein the heat shield is affixed on one of the heat exchangers of the plurality of heat exchangers.

9. The electrothermal subassembly of the steam thruster for nanosatellites according to claim 1, wherein the steam thruster is manufactured utilizing an additive manufacturing device.

* * * * *